United States Patent [19]
Carriero

[11] Patent Number: 5,885,463
[45] Date of Patent: Mar. 23, 1999

[54] PH CONTROL PROCESS AND SYSTEM

[75] Inventor: Antonio Carriero, Erba, Italy

[73] Assignee: Ecografica S.r.l., Merone, Italy

[21] Appl. No.: 873,170

[22] Filed: Jun. 11, 1997

[51] Int. Cl.$^6$ ..................................................... C02F 9/00
[52] U.S. Cl. ...................... 210/662; 210/695; 210/743; 210/96.1; 210/196; 210/202; 210/251
[58] Field of Search ..................... 210/662, 669, 210/695, 743, 96.1, 221.2, 223, 257.1, 266, 194, 196, 765, 202, 251

[56] References Cited

U.S. PATENT DOCUMENTS

| | | | |
|---|---|---|---|
| 4,274,959 | 6/1981 | Roediger | 210/221.2 |
| 4,917,806 | 4/1990 | Matsunaga et al. | 210/662 |
| 5,145,585 | 9/1992 | Coke | 210/743 |

*Primary Examiner*—Ivars Cintins
*Attorney, Agent, or Firm*—Wenderoth, Lind & Ponack, L.L.P.

[57] ABSTRACT

A process for continuously controlling the pH value of an industrial process liquid removes impurities contained therein from the liquid and controls its pH value. If necessary, an aqueous solution having an acid or basic character is added. The purified process liquid having the desired acid or basic pH value is fed to the industrial process, maintaining the character of the aqueous solution constantly acid or basic by means of ion exchange resins and repeating the above steps. The system comprises a first tank (11) with a pH-meter (18) for the process liquid to be treated, a second tank (12) for the aqueous solution, pumps or the like (13,16) for recirculating the process liquid in the first tank (11) and supplying it to the industrial process and for recirculating the aqueous solution in the second tank (12), and a valve arrangement (20) for admitting to the first tank (11) the pH adjusting liquid to be added to the process liquid to be treated.

13 Claims, 2 Drawing Sheets

PH CONTROL PROCESS AND SYSTEM

BACKGROUND OF THE INVENTION

The present invention relates to an industrial processes requiring a continuous control of the pH value of process liquids and, more particularly, an innovative process for controlling the pH value of such process liquids and a system for carrying out such a process. The process and the system of the present invention are particularly suited for use in the graphic arts and printing industry where control of the pH value of liquids used in the pre-printing and offset printing processes, for example aqueous solutions, is required.

DESCRIPTION OF THE PRIOR ART

In industrial processes of this kind, the problem relating to the chemical treatment of liquids employed in many printing processes before being reused is most important.

Generally, before the reuse of liquids of the industrial processes, their pH value must be restored to the nominal value. According to known processes, this is achieved by adding chemical additives having acid or basic pH values to the process liquids, depending on the required pH value. These additives are mixed together with the process liquid, and therefore they must be added every time a change of the pH value of the process liquid from its nominal value occurs. Therefore, there is a considerable consumption of chemical additives which, besides being expensive, have the disadvantages of considerably increasing the conductivity of the process liquids and of producing foams and precipitates that negatively affect the printing process. As a matter of fact, the printing quality so obtained is rather poor. Another drawback resulting from the use of chemical additives is related to the environmentally dangerous and harmful fumes produced in the printing rooms.

SUMMARY OF THE INVENTION

One object of the present invention is to provide an improved process for continuously controlling the pH value of industrial process liquids which does not rely upon the addition of chemical additives.

Another object of the present invention is to provide a system for continuously controlling the pH value of industrial process liquids which is compact in size and less expensive than conventional systems requiring the addition of chemical additives.

More particularly, the process according to the invention for continuously controlling the pH value of an industrial process liquid, is characterized in that it comprises the steps of:

a) removing, from a process liquid coming from an industrial process, impurities contained therein and controlling its pH value;

b) if the pH value of the purified process liquid differs from its nominal value, adding thereto an aqueous solution having an acid or basic character, depending on the employed process liquid, until its pH value reaches its nominal value;

c) feeding the purified process liquid having the desired acid or basic pH value to the intended industrial process;

d) maintaining the character of the aqueous solution to be added to the process liquid constantly acid or basic by means of ion exchange resins; and e) repeating steps a),b),c) and d).

According to a feature of the present invention, the removing step may be carried out by mechanical, physical or chemical-physical means.

The system for carrying out the process according to the present invention is characterized in that it comprises:

a first tank provided with a pH-meter for the process liquid to be treated, a second tank for a pH adjusting liquid, recirculating means for recirculating the process liquid to be treated in the first tank and supplying it to the intended industrial process and for recirculating the pH adjusting liquid in the second tank, and valve means for admitting to the first tank the pH adjusting liquid to be added to the process liquid to be treated.

According to a feature of the present invention, in the first tank mechanical, physical or chemical-physical means are provided for removing the impurities contained in the process liquid to be treated.

According to a feature of the present invention, the pH adjusting liquid is an acid or basic aqueous solution.

DESCRIPTION OF THE PREFERRED EMBODIMENT pH CONTROL PROCESS

The pH control process according to the invention will be now described in more detail as follows.

Firstly, the liquid from an industrial process, having an acid or basic character, depending on the kind of process, undergoes a separating operation in order to remove therefrom impurities resulting from its use in different industrial processes.

Possibly, during this step the process liquid may undergo a magnetic treatment aimed at reducing its surface tension. This is achieved by letting the process liquid flow through a steady magnetic field having a suitable strength generated by permanent magnets. Alternatively, a stream of gas, preferably air, may be blown in the process liquid to reduce its surface tension.

Then, the pH value of the purified process liquid is controlled; if the pH value corresponds to the nominal value, the purified process liquid is fed to the intended use in the industrial process. If instead the pH value of the process liquid differs from the nominal value, an acid or basic aqueous solution is added to the purified process liquid until the pH value of the purified process liquid reaches the desired value.

Afterwards, the purified process liquid, having its nominal pH value obtained with the addition of the acid or basic aqueous solution, is supplied to the intended use in the industrial process.

The steps of the process are cyclically repeated, while the character of the aqueous solution to be added to the purified process liquid is constantly maintained acid or basic by means of ion exchange resins.

pH CONTROL SYSTEM

Figure 1:
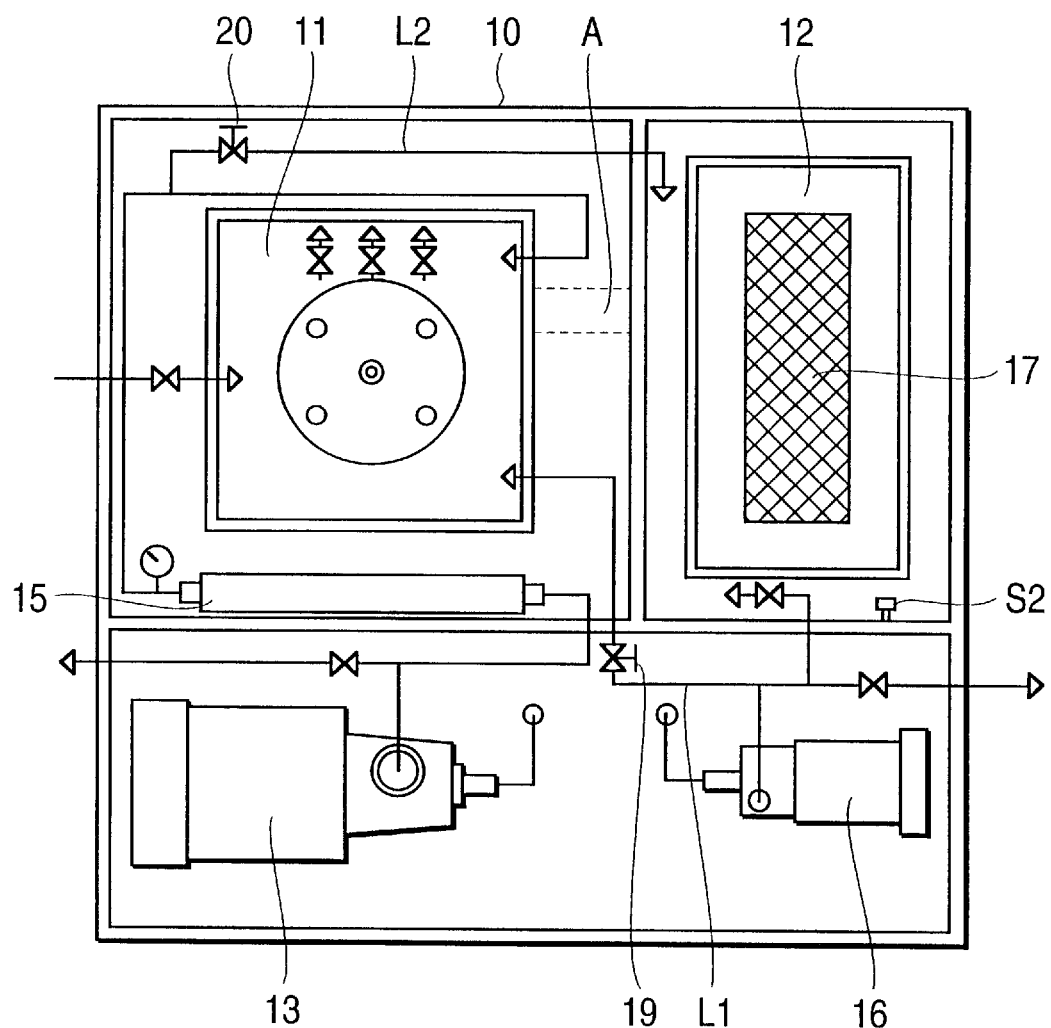
FIG. 1 is a plan view of a system for carrying out the process of the invention.
Figure 2:
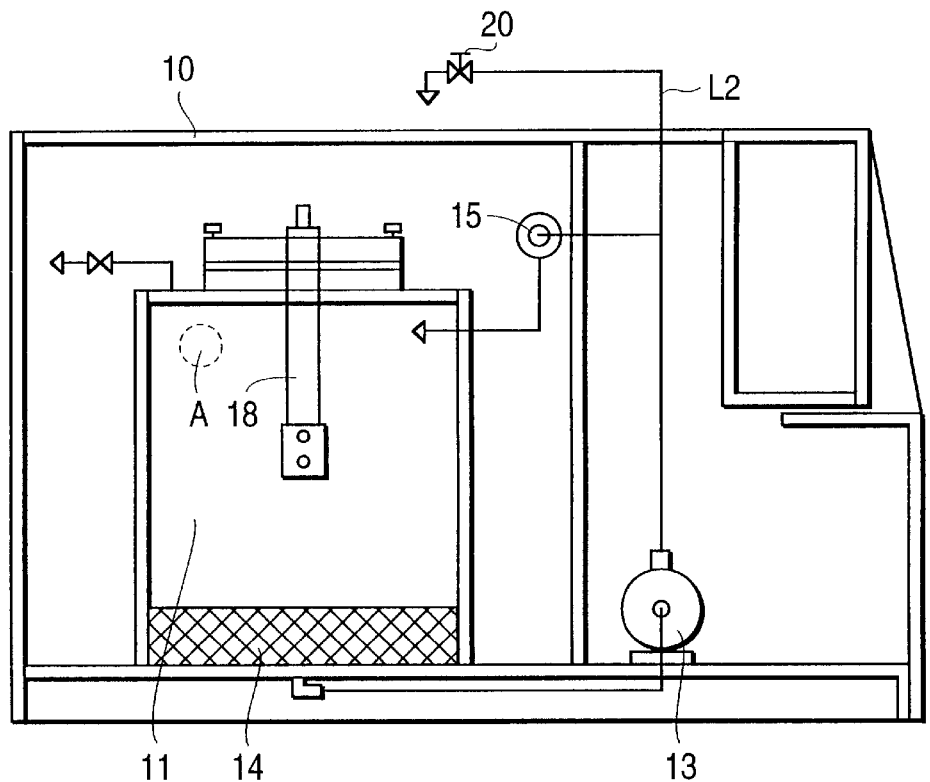
FIG. 2 is a sectional view of FIG. 1.
Figure 3:
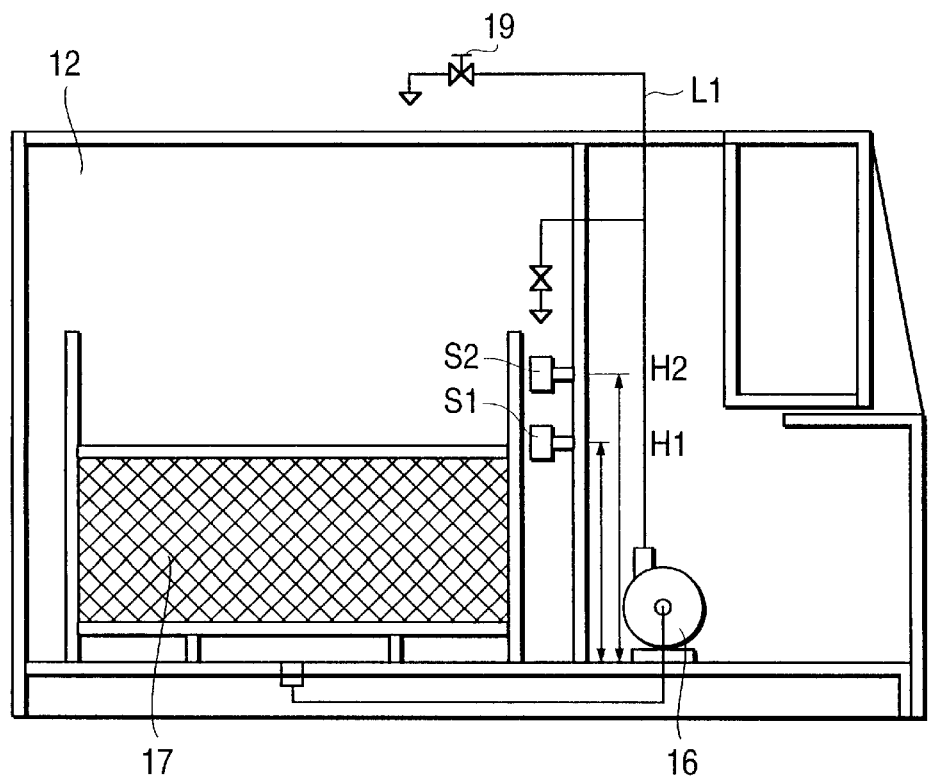
FIG. 3 is another sectional view of FIG. 1.

Referring to FIGS. 1, 2 and 3, there is shown a preferred embodiment of systems for carrying out the process of the invention. This system is enclosed in a box 10 and comprises a first tank 11 intended to contain the process liquid coming from an industrial process and requiring pH adjusting treatment and a second tank 12 intended to contain a pH adjusting liquid, in this case an acid or basic aqueous solution, depending on the need.

The process liquid to be treated in the tank 11 undergoes a separating operation during which the impurities contained therein are removed by means of a separator 14 placed at the bottom of the tank 11. The separator may be a filter if a mechanical separation of solid impurities is required. In this case, a pump 13 recirculates the process liquid to be treated in the tank 11 through the filter 14. The separator may also be of the physical or chemical-physical kind if the impurities contained in the process liquid to be treated are nonsolid. The process liquid to be treated coming from the separator flows through a magnetic device 15 intended to reduce the surface tension of the process liquid by means of a magnetic field generated by permanent magnets.

Alternatively, a gas, preferably air stream blower (not shown), may be used for reducing the surface tension of the process liquid.

The pH adjusting liquid, i.e. the acid or basic aqueous solution in the tank 12, is recirculated by means of a pump 16. This aqueous solution is maintained acid or basic by continuously flowing it through an ion exchanger 17 provided at the bottom of tank 12.

A pH-meter 18 immersed in the tank 11 permits the pH value of the process liquid to be treated to be easily measured. Generally, the process liquid to be treated requires an adjustment of the pH value for its reuse in the intended industrial process. Therefore, if the pH-meter measures a pH value different from that required for the intended industrial process, a solenoid valve 19 in a line L1 branching from the circuit in which the acid or basic aqueous solution is recirculating is opened. The aqueous solution thus supplied to the tank 11 is added to the process liquid contained therein. When the pH-meter 18 measures a pH value of the process liquid contained in the tank 11 corresponding to the value required for the intended industrial process, the solenoid valve 19 is closed and the purified process liquid with the desired pH value is supplied to the industrial process for its reuse therein.

If the level of the acid or basic aqueous solution during the addition thereof to the process liquid contained in the tank 11 falls below the value H1, a level sensor S1 controls the opening of a solenoid valve 20 in the line L2 branching from the recirculating circuit of the purified process liquid contained in tank 11. This permits the purified process liquid to be supplied to the tank 12 containing the acid or basic aqueous solution until the latter reaches level H2. When this occurs, a sensor S2 causes the solenoid valve 20 to be closed.

Alternatively, for restoring the level of the acid or basic aqueous solution in the tank 12, in a side wall of the tank 11 an overflow A is provided through which the process liquid contained in tank 11 can flow into the tank 12.

An acoustic and visual signaling system indicates when the charge of the ion exchange resins is exhausted. The exhausted ion exchange resins can be regenerated by means of well known separate equipment that can be connected to the ion exchanger, or the ion exchange resins can be replaced with fresh ion exchange resins, while the exhausted ion exchange resins are removed and delivered to a separate regeneration station.

As already said, the pH control process and system according to the invention is particularly adapted to be applied in the graphic arts and in the printing industries. In this case the process liquid to be treated is mainly process water and the pH adjusting liquid is an acid aqueous solution. The ion exchange resins are of the cationic type.

As can be understood from the above description, the pH control system according to the invention no longer requires the addition of chemical additives, as for example isopropyl alcohol in the case of printing processes. Therefore, the pH control system results in one that is less expensive than other known systems, and does not produce undesired effects such as an increase of the conductivity of the process liquid or the formation of foams or precipitates.

Although the invention has been disclosed and illustrated in connection with a preferred embodiment only, it is to be understood that all changes and modifications within the reach of those skilled in the art may be made thereto without departing from the scope of the claims. Particularly, the two tanks can be contiguous and can communicate by means of an overflow.

What is claimed is:

1. A process for continuously controlling the pH value of process water used in a graphic art printing process to a required pH value, comprising:
    a) removing impurities from process water used in the graphic art printing process so as to obtain purified process water;
    b) reducing the surface tension of the process water;
    c) controlling the pH value of the process water to obtain purified and pH adjusted process water, wherein said controlling comprises adding an acid or basic aqueous solution to the purified process water until the pH value is adjusted to the required pH value when the pH value of the purified process water differs from the required pH value;
    d) feeding the purified and pH adjusted process water to the graphic art printing process;
    e) maintaining the acidity or alkalinity of the acid or basic aqueous solution to be added to the purified process water at a constant level by means of ion exchange resins; and
    f) repeating a)–e).

2. The process according to claim 1, wherein said removing comprises filtering impurities from the process water.

3. The process of claim 1, wherein said controlling comprises checking the pH value of the process water.

4. An apparatus for continuously controlling the pH value of process water of a graphic art printing process, comprising:
    a first tank for process water to be treated, said first tank comprising a means for removing impurities contained in the process water and a pH meter for measuring the pH value of the process water;
    a second tank containing a basic or acid aqueous solution for adjusting the pH value of the process water in said first tank, said second tank comprising ion exchange resins for maintaining the alkalinity or acidity of the basic or acid aqueous solution at a constant level;
    means for recirculating the process water to be treated in said first tank and supplying the process water to be treated to the graphic art printing process, and for recirculating the basic or acid aqueous solution for adjusting the pH value of the process water in said second tank; and
    means for admitting the basic or acid aqueous solution to said first tank from said second tank for controlling the pH value of the process water in said first tank.

5. The apparatus of claim 4, wherein said means for removing impurities comprises a filter.

6. The apparatus of claim 4, wherein said means for admitting comprises a valve.

7. The apparatus of claim 6, wherein said means for admitting has said valve interlocked with said pH meter such that the basic or acid aqueous solution is admitted to said first tank only when the pH value of the process water in said first tank differs from a pH value required for the graphic art printing process.

8. The apparatus of claim 4, wherein said recirculating means comprises pumps or ejectors.

9. A process for continuously controlling the pH value of process water to a required pH value, comprising:

supplying process water from a process to a first tank;

removing impurities from the process water tank so as to obtain purified process water in the first tank;

reducing the surface tension of the process water so as to obtain process water in the first tank having reduced surface tension;

controlling the pH value of the process water in the first tank to obtain purified and pH adjusted process water, wherein said controlling comprises adding an acid or basic aqueous solution from a second tank to the purified process water in the first tank when the pH value of the process water in the first tank differs from the required pH value until the pH value is adjusted to the required pH value;

feeding the purified and pH adjusted process water back to the process;

maintaining the acidity or alkalinity of the acid or basic aqueous solution in the second tank, to be added to the purified process water, at a constant level by means of ion exchange resins; and repeating said supplying, removing, reducing, controlling, feeding and maintaining.

10. The process of claim 9, wherein said removing and said reducing comprise pumping the process water in the first tank through a filter and a magnetic surface tension reducer while recirculating the process water in the first tank.

11. The process of claim 9, wherein said step of controlling comprises pumping the aqueous solution from the second tank to the first tank.

12. The process of claim 9, and further comprising:

replenishing the aqueous solution in the second tank when the level of aqueous solution in the second tank falls below a predetermined level by adding process water to the second tank from the first tank.

13. The process of claim 9, and further comprising:

allowing process water in the first tank to overflow the first tank into the second tank when the amount of process water in the first tank goes above a predetermined level.

* * * * *

UNITED STATES PATENT AND TRADEMARK OFFICE
CERTIFICATE OF CORRECTION

PATENT NO. : 5,885,463
DATED : 03/23/99
INVENTOR(S) : Antonio CARRIERO

It is certified that error appears in the above-identified patent and that said Letters Patent is hereby corrected as shown below:

On the cover page of the patent, the following section is inserted:

--[30] Foreign Application Priority Data

June 11, 1996 [IT] Italy MI96A 001183--.

Signed and Sealed this

Twenty-first Day of December, 1999

Attest:

Q. TODD DICKINSON

*Attesting Officer*    *Acting Commissioner of Patents and Trademarks*